US007415248B2

(12) United States Patent
Andersson et al.

(10) Patent No.: US 7,415,248 B2
(45) Date of Patent: Aug. 19, 2008

(54) MULTIBAND RADIO ANTENNA WITH A FLAT PARASITIC ELEMENT

(75) Inventors: Johan Andersson, Malmö (SE); Kenneth Håkansson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 695 days.

(21) Appl. No.: 10/531,247

(22) PCT Filed: Oct. 20, 2003

(86) PCT No.: PCT/EP03/11589

§ 371 (c)(1),
(2), (4) Date: Apr. 14, 2005

(87) PCT Pub. No.: WO2004/038856

PCT Pub. Date: May 6, 2004

(65) Prior Publication Data

US 2006/0099914 A1 May 11, 2006

Related U.S. Application Data

(60) Provisional application No. 60/421,705, filed on Oct. 28, 2002.

(30) Foreign Application Priority Data

Oct. 22, 2002 (EP) .................................. 02445140

(51) Int. Cl.
*H04B 1/30* (2006.01)

(52) U.S. Cl. ....................... 455/90.3; 343/702; 343/725

(58) Field of Classification Search ................ 455/90.3; 343/702, 725
See application file for complete search history.

(56) References Cited

U.S. PATENT DOCUMENTS

| | | | | |
|---|---|---|---|---|
| 6,429,819 | B1 * | 8/2002 | Bishop et al. | 343/725 |
| 6,545,640 | B1 | 4/2003 | Herve et al. | |
| 2002/0070902 | A1 | 6/2002 | Johnson et al. | |
| 2006/0099914 | A1 * | 5/2006 | Andersson | 455/90.3 |
| 2007/0040751 | A1 * | 2/2007 | Boyle | 343/702 |

FOREIGN PATENT DOCUMENTS

| | | |
|---|---|---|
| EP | 1 018 779 | 7/2000 |
| EP | 1 128 466 | 8/2001 |
| FR | 2 800 920 | 5/2001 |

* cited by examiner

*Primary Examiner*—William D Cumming
(74) *Attorney, Agent, or Firm*—Myers Bigel Sibley & Sajovec

(57) ABSTRACT

A multiband radio antenna device (1) for a radio communication terminal, comprising a flat ground substrate (2), and in a plane parallel to said ground substrate a flat parasitic element (7) and a flat antenna element (3). Said antenna element has a longitudinal member (4), a first transverse member (5) extending from a first end portion of said longitudinal member, and a second transverse member (6) extending from a centre portion of said longitudinal member, wherein said parasitic element extends adjacent to an outer portion of and parallel to said second transverse member. A feeding point (8) is disposed at a center portion of said second transverse member. The parasitic element has a first ground connection (9) adjacent to said feeding point, a second ground connection (10) is disposed at an end portion of said second transverse member, and a third ground connection (11) is disposed at a center portion of said first transverse member.

20 Claims, 3 Drawing Sheets

MULTIBAND RADIO ANTENNA WITH A FLAT PARASITIC ELEMENT

RELATED APPLICATIONS

The present application is a 35 U.S.C. § 371 national phase application of PCT International Application No. PCT/EP2003/011589, having an international filing date of Oct. 20, 2003 and claiming priority to European Patent Application No. 02445140.3, filed Oct. 22, 2002, and to U.S. Provisional Application No. 60/421,705 filed Oct. 28, 2002, the disclosures of which are incorporated herein by reference in their entireties. The above PCT International Application was published in the English language and has International Publication No. WO 2004/038856 A1.

FIELD OF THE INVENTION

The present invention relates generally to antennas for radio communication terminals and, in particular, to compact built-in antennas devised to be incorporated into portable terminals and having a wide bandwidth to facilitate operation of the portable terminals within different frequency bands.

BACKGROUND

Since the end of the $20^{th}$ century the cellular telephone industry has had enormous development in the world. From the initial analogue systems, such as those defined by the standards AMPS (Advanced Mobile Phone System) and NMT (Nordic Mobile Telephone), the development has during recent years been almost exclusively focused on standards for digital solutions for cellular radio network systems, such as D-AMPS (e.g., as specified in EIA/TIA-IS-54-B and IS-136) and GSM (Global System for Mobile Communications). Different digital transmission schemes are used in different systems, e.g. time division multiple access (TDMA) or code division multiple access (CDMA). Currently, the cellular technology is entering the so-called $3^{rd}$ generation, providing several advantages over the former, $2^{nd}$ generation, digital systems referred to above. Among those advantages an increased bandwidth will be provided, allowing effective communication of more complex data. The $3^{rd}$ generation of mobile systems has been referred to as the UMTS (Universal Mobile Telephony System) in Europe and CDMA2000 in the USA, and is already implemented in Japan to some extent. Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

One evolution in cellular communication services involves the adoption of additional frequency bands for use in handling mobile communications, e.g., for Personal Communication Services (PCS) services. Taking the U.S. as an example, the Cellular hyperband is assigned two frequency bands (commonly referred to as the A frequency band and the B frequency band) for carrying and controlling communications in the 800 MHz region. The PCS hyperband, on the other hand, is specified in the United States to include six different frequency bands (A, B, C, D, E and F) in the 1900 MHz region. Thus, eight frequency bands are now available in any given service area of the U.S. to facilitate communication services. Certain standards have been approved for the PCS hyperband (e.g., PCS1900 (J-STD-007)), while others have been approved for the Cellular hyperband (e.g., D-AS (IS-136)). Other frequency bands in which these devices will be operating include GPS (operating in the 1.5 GHz range) and UMTS (operating in the 2.0 GHz range). Each one of the frequency bands specified for the Cellular and PCS hyperbands is allocated a plurality of traffic channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, hand-off, and cell selection or reselection instructions as a mobile station travels out of the radio coverage of one cell and into the radio coverage of another cell. The control and voice channels may operate using either analogue modulation or digital modulation.

The signals transmitted by a base station in the downlink over the traffic and control channels are received by mobile or portable terminals, each of which have at least one antenna. Historically, portable terminals have employed a number of different types of antennas to receive and transmit signals over the air interface. For example, monopole antennas mounted perpendicularly to a conducting surface have been found to provide good radiation characteristics, desirable drive point impedance and relatively simple construction. Monopole antennas can be created in various physical forms. For example, rod or whip antennas have frequently been used in conjunction with portable terminals. For high frequency applications where an antenna's length is to be minimised, another choice is the helical antenna. In addition, mobile terminal manufacturers encounter a constant demand for smaller and smaller terminals. This demand for miniaturisation is combined with desire for additional functionality such as having the ability to use the terminal at different frequency bands and different cellular systems.

It is commercially desirable to offer portable terminals which are capable of operating in widely different frequency bands, e.g., bands located in the 1500 MHz, 1800 MHz, 1900 MHz, 2.0 GHz and 2.45 GHz regions. Accordingly, antennas which provide adequate gain and bandwidth in a plurality of these frequency bands will need to be employed in portable terminals. Several attempts have been made to create such antennas.

In order to reduce the size of the portable radio terminals, built-in antennas have been implemented over the last couple of years. The general desire today is to have an antenna, which is not visible to the customer. Today different kinds of patches are used, with or without parasitic elements. The most common built-in antennas currently in use in mobile phones are the so-called planar inverted-F antennas (PIFA). This name has been adopted due to the fact that the antenna looks like the letter F tilted 90 degrees in profile. Such an antenna needs a feeding point as well as a around connection. If one or several parasitic elements are included nearby, they can be either grounded or dielectrically separated from ground. The geometry of a conventional PIFA antenna includes a radiating element, a feeding pin for the radiating element, a ground pin for the radiating element, and a ground substrate commonly arranged on a printed circuit board (PCB). Both the feeding pin and the ground pin are arranged perpendicular to the ground plane, and radiating element is suspended above the ground plane in such a manner that the ground plane covers the area under the radiating element. This type of antenna, however, generally has a fairly small bandwidth in the order of 100 MHz. In order to increase the bandwidth for an antenna of this design, the vertical distance between the radiating element and the PCB ground has to be increased, i.e. the height at which the radiating element is placed above the PCB is increased. Another solution to this problem is to add a dielectric element between the antenna and the PCB, in order to make the electrical distance longer than the physical distance.

U.S. Pat. No. 6,326,921 to Ying et al discloses a built-in, low-profile antenna with an inverted planar inverted F-type (PIFA) antenna and a meandering parasitic element, and having a wide bandwidth to facilitate communications within a plurality of frequency bands. A main element is placed at a predetermined height above a substrate of a communication device and the parasitic element is placed on the same substrate as the main antenna element and is grounded at one end. The feeding pin of the PIFA is proximal to the ground pin of the parasitic element. The coupling of the meandering, parasitic element to the main antenna results in two resonances. These two resonances are adjusted to be adjacent to each other in order to realise a broader resonance encompassing the DCS (Digital Cellular System), PCS and UMTS frequency ranges.

Today, the concept of built-in antennas is well known and extensively used by the mobile phone manufacturers. However, it is a fairly new concept, and the performance of such antennas is still a problem when even wider band capabilities are desired. Consequently, prior art antenna designs will still be a limiting factor when developing radio terminals with adequate bandwidth to cover plural bands, such as for example AS, EGSM (Extended GSM), DCS and PCS. A more general problem with built-in antennas is not only small band width, but also significantly worse gain performance than a traditional external antenna i.e. some kind of stub antenna.

SUMMARY OF THE INVENTION

Hence, it is an object of the present invention to overcome the above-identified deficiencies related to the prior art, and more specifically to provide an antenna structure suitable for built-in antennas, at the same time having a wide bandwidth which enables the antenna to operate at a plurality of frequency bands.

According to a first aspect, this object is fulfilled by a multiband radio antenna device for a radio communication terminal, comprising a flat ground substrate, and in a plane parallel to said ground substrate a flat parasitic element and a flat antenna element with a feeding point, wherein said antenna element has a first longitudinal member, a first transverse member extending from a first end portion of said first longitudinal member, and a second transverse member extending from a centre portion of said first longitudinal member in the same direction as said first transverse member, wherein said parasitic element extends adjacent to an outer portion of and parallel to said second transverse member.

Preferably, said feeding point is disposed at a centre portion of said second transverse member.

In one embodiment, said parasitic element has a first ground connection disposed adjacent to said feeding point.

Furthermore, a second ground connection may be disposed at an end portion of said second transverse member opposite said first longitudinal member.

In a preferred embodiment, a third ground connection is further disposed at a centre portion of said first transverse member.

Preferably, said antenna element has a second longitudinal member extending from said end portion of said second transverse member, away from said first transverse member.

In one embodiment, said antenna element has a third transverse member extending from an end portion of said second longitudinal member opposite said second transverse member, towards said first longitudinal member.

Preferably, said antenna element has a fourth transverse member extending from said first longitudinal member between said second and said third transverse members.

In a preferred embodiment, said feeding point is disposed on a protruding member at said centre portion of the second transverse member, protruding towards first transverse member. Said protruding member is preferably tapered towards said first transverse member. In an advantageous variant of this embodiment, said parasitic element has a leg member extending parallel to a side of the tapered protruding member facing away from said first longitudinal member.

In one embodiment, a an outer portion, extending from said centre portion, of said first transverse member has a side edge facing said second transverse member, which side edge extends at an angle towards said second transverse member, such that said first transverse member widens towards its outer end.

In a preferred embodiment, said parasitic element has one ground connection, whereas said antenna element has two ground connections.

Preferably, said round plane has a longitudinal length of one third of a selected base band.

According to a second aspect, the object of the invention is fulfilled by a radio communication terminal comprising a multiband radio antenna device according to any of the previous claims.

The detailed description shows specific features of various embodiments related to the aspects above.

BRIEF DESCRIPTION OF THE DRAWINGS

The features and advantages of the present invention will be more apparent from the following description of the preferred embodiments with reference to the accompanying drawings, on which FIG. 1 schematically illustrates a multiband radio antenna according to an embodiment of the invention.

DETAILED DESCRIPTION OF PREFERRED EMBODIMENTS

Figure 1:
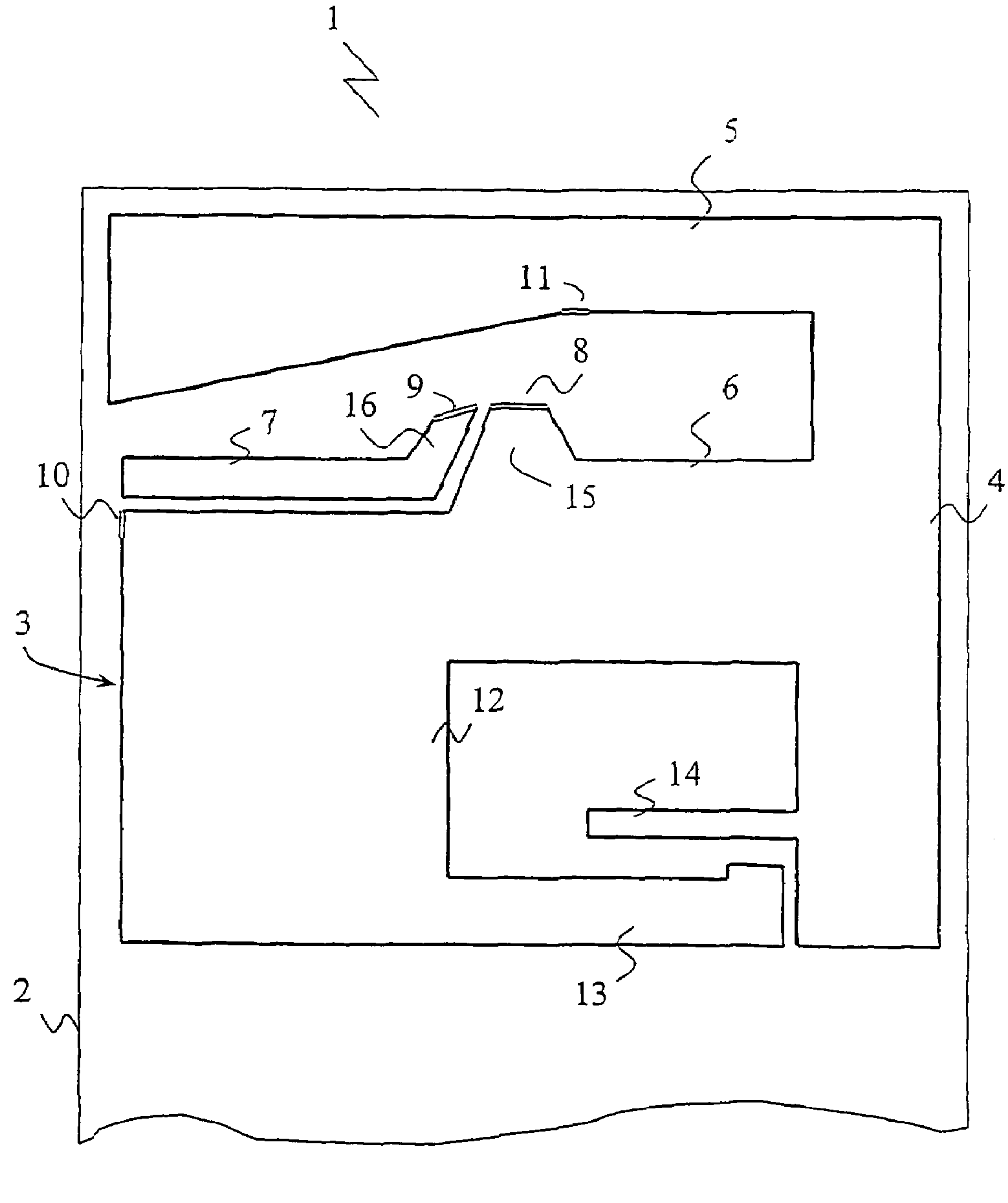

The present description refers to radio terminals as a device in which to implement a radio antenna design according to the present invention. The term radio terminal includes all mobile equipment devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants), vehicle-mounted radio communication devices, or the like, as well as portable laptop computers devised for wireless communication in e.g. a WLAN (Wireless Local Area Network). Furthermore, since the antenna as such is suitable for but not restricted to mobile use, the term radio terminal should also be understood as to include any stationary device arranged for radio communication, such as e.g. desktop computers, printers, fax machines and so on, devised to operate with radio communication with each other or some other radio station. Hence, although the structure and characteristics of the antenna design according to the invention is mainly described herein, by way of example in the implementation in a mobile phone, this is not to be interpreted as excluding the implementation of the inventive antenna design in other types of radio terminals, such as those listed above. Furthermore, it should be emphasised that the term comprising or comprises, when used in this description and in the appended claims to indicate included features, elements or steps, is in no way to be interpreted as excluding the presence of other features elements or steps than those expressly stated.

Several of the larger mobile phone manufacturers, e.g. Ericsson® and Nokia®, have launched mobile phones for cellular communication networks and implementing built-in antennas for both dual band and triple band operation. By built-in is here meant that the antenna is placed inside, or adjacent to, the housing or chassis of the mobile phone without protruding elements. The principles of the Planar Inverted F Antenna type have been briefly discussed above. Although it may be embodied in different ways, it is basically defined by the following features:

- Dual or triple band capacity;
- Patch parallel to the printed circuit board (PCB), i.e. the ground plane;
- Air or some dielectric material between antenna and PCB;
- Sizes are in the neighbourhood of L*W*H=40*18*8 mm;
- The distance (H) between antenna and PCB is critical for good VSWR and gain, and normal distance is 7-10 mm between these two planes;
- The antenna needs both feeding and grounding, where one of each is common.

The present invention provides an antenna design with a complex pattern and three grounding points. Computer simulations with surprisingly good results have been made. These simulations have been performed using the tool IE3D, distributed by Zeland Inc. This tool uses the Moment-Method as a mathematical solver, and simulation results obtained correlate well with measurement tests on prototypes, such as those disclosed in FIG. 5, which will be explained further down.

An antenna concept or design is described herein, comprising the antenna structure, its relation to ground, and its implementation in a radio terminal, with reference to the accompanying drawings.

FIG. 1 discloses an enlarged view of an antenna device 1 according to the invention. The antenna device 1 comprises an antenna element 3, a parasitic element 7 and a ground plane or substrate 2. As is indicated by the uneven line at the bottom of the drawing, only a cut-off portion of the ground plane 2 is illustrated in FIG. 1. The actual length of ground plane 2, that is the height in FIG. 1, is preferably approximately equal to one third of the wavelength for the lower frequency band for which the multiband antenna 3 is tuned. In one example, said lower band is 900 MHz, wherein the ground plane length can be calculated to approximately 11 cm. The implementation of the ground plane 2 having a length of about one third of the lower band wavelength constitutes a preferred embodiment but it should be noted that other lengths may be used as well.

The antenna 3 has a fairly complex structure in its preferred embodiment as illustrated in FIG. 1, and measurements made on this structure has shown excellent results. The structure basically comprises a number of antenna elements substantially extending in a longitudinal direction or a transverse direction, perpendicular to said longitudinal direction. By longitudinal direction is here meant a direction in which the ground plane 2 extends, i.e. vertical in FIG. 1, whereas the transverse direction extends from left to right or vice versa. The antenna comprises one integrated antenna element 3 and a parasitic element 7, electrically separated from the antenna element 3. As illustrated in the drawing, the antenna element comprises a first longitudinal member 4, which extends in the longitudinal direction a part of a side edge of the ground plane 2. At a first end of a first longitudinal member 4, the top end in the drawing, a first transverse member 5 extends perpendicular to the first longitudinal member along the top edge of ground plane 2. The first transverse member has an upper straight edge and a lower edge, which at first is parallel to the upper edge. From the central portion of the first transverse member the lower edge is slightly angled downwards, such that the first transverse member 5 widens from that central portion to the end portion opposite the first longitudinal member 4. From a central portion of the first longitudinal member 4, a second transverse member 6 extends likewise perpendicular to the first longitudinal member 4, consequently substantially parallel to the first transverse member 5. The parasitic element 7 is located adjacent to an outer portion of the second transverse member 6, and extends substantially parallel to said second transverse member 6. At a central portion of the second transverse member 6, a protruding member 15 is formed, projecting towards the first transverse member 5. The protruding member 15 is tapered towards said first transverse member 5, consequently having angled side edges, but has a straight ending perpendicular to the first longitudinal member 4. The parasitic element 7 extends, as mentioned, substantially perpendicular to the first longitudinal member 4, but further comprises a leg member 16 extending at an angle towards said first transverse member and parallel to the adjacent side edge of protruding member 15. The leg member 16 ends approximately at the same longitudinal position as protruding member 15, but preferably has a top edge sloping slightly downwards in the direction away from the first longitudinal member 4.

The structure of the antenna device according to the present invention has one feeding point 8 and three ground connections 9,10,11. The feeding point 8 is connected to the top edge of the protruding member 15, and is indicated by a double line in the drawing. A first ground connection 9 of the antenna device is connected to the top edge of the leg 16 of the parasitic element 7, consequently adjacent to the feeding point 8. Also the first grounding point or connection 9 is indicated by a double line in the drawing. A second grounding point or connection 10 is positioned at the outermost end of the second transverse antenna member 6, adjacent to a second end of antenna member 7 opposite the end were said first ground connection 9 is disposed. A third ground connection 11 is disposed at a central portion of the first transverse member 5, at a position were the widening of said first transverse member 5 begins. Also the second and third ground connections are indicated by double lines.

As is evidenced by the drawing, a second longitudinal member 12 extends from the end portion of the second transverse member, in a direction downwards away from the first transverse member 5. The second longitudinal member 12 is significantly wider than the first longitudinal member 4, but also significantly shorter. At the lower end of the second longitudinal member 12, a third transverse member 13 extends towards the first longitudinal member 4, leaving only a small gap between the end portion of a third transverse member 13 and the first longitudinal member 4. Finally, the fourth transverse member 14 extends from the first longitudinal member 4 between the second 6 and third 13 transverse members, and significantly closer to the third transverse member 13. The fourth transverse member 14 is significantly thinner than the third transverse member 13.

In accordance with the established art, when two adjacent parts has significantly different widths, generally a multi-resonance is achieved, causing a broad frequency performance. With the structure of the embodiment as disclosed in FIG. 1, this is achieved both with the parasitic element 7 and the second transverse member 6, and between the third and forth transverse members 13, 14 respectively. Measurements on this structure have revealed astonishing broad band performance on plural bands with good matching. The size of the antenna structure including the antenna element 3 and the parasitic element 7, is about 38 mm wide and 37 mm in the longitudinal direction. Preferably it is applied about 8 mm over ground plane 2. The antenna structure itself is very thin and can be made of for instance a flex film.

Figure 2:
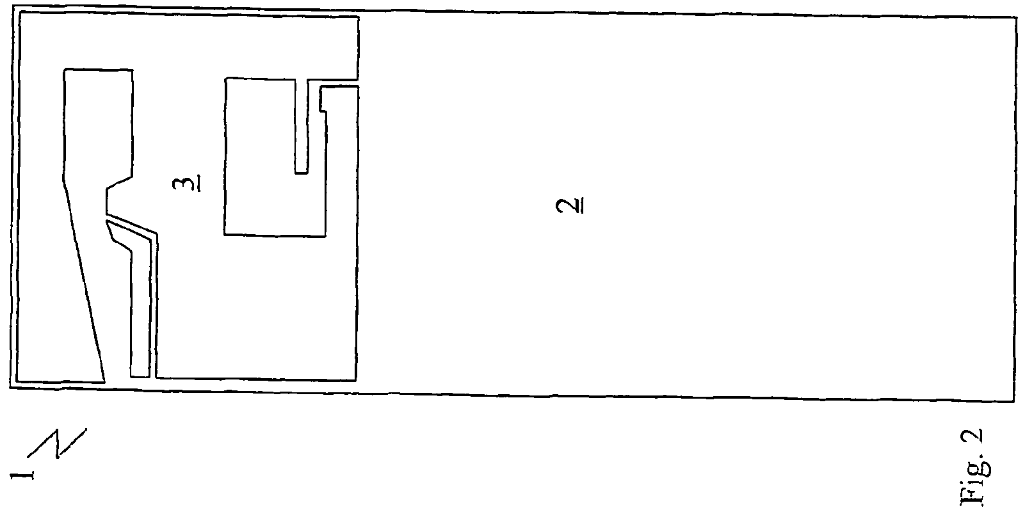
FIG. 2 shows a full view of the multiband radio antenna arrangement according to FIG. 1.

FIG. 2 illustrates the antenna device according to an embodiment of the present invention, disclosing the full length of ground plane 2.

Figure 3:
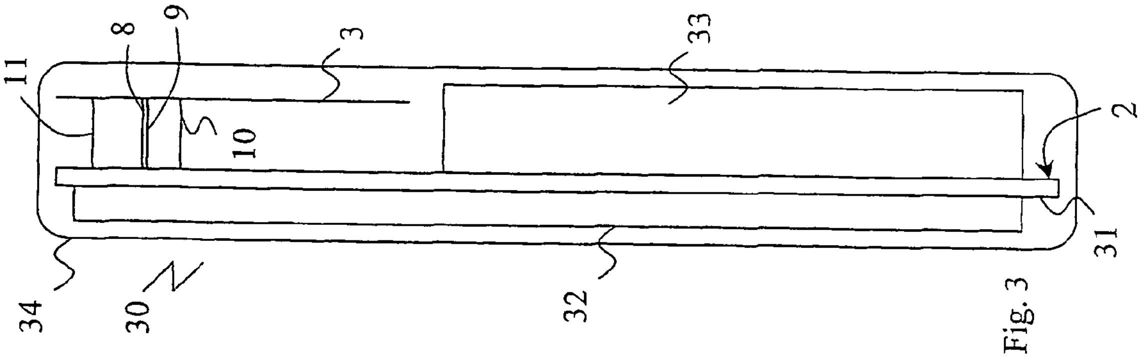
FIG. 3 schematically illustrates a cross-sectional side view of a radio communication terminal including the antenna arrangement of FIG. 2.

FIG. 3 illustrates a cross-sectional side view of a radio communication terminal in the embodiment of a cellular mobile phone 30, devised for multiband radio communication. The terminal 30 comprises a chassis incorporating a PCB 31, which extends longitudinally in the terminal 30. The chassis carries functional members 32 of the terminal, including user interfaces and electronics, though not further specified in the drawing. A preferably detachable battery 33 is also connected to the terminal. At the top of the drawing, the antenna 3 is also illustrated, spaced apart from the PCB 31. The flat ground substrate 2 is preferably devised as a conductive layer in the PCB 31, either on an outer surface thereof or as an intermediate layer. The three ground connections 9, 10 and 11 are also schematically illustrated, as well as the feeding point connection 8 to the PCB 31. A housing 34 encloses the terminal, although e.g. the battery 33 and the user interfaces preferably are not covered by the housing 34.

Figure 4:
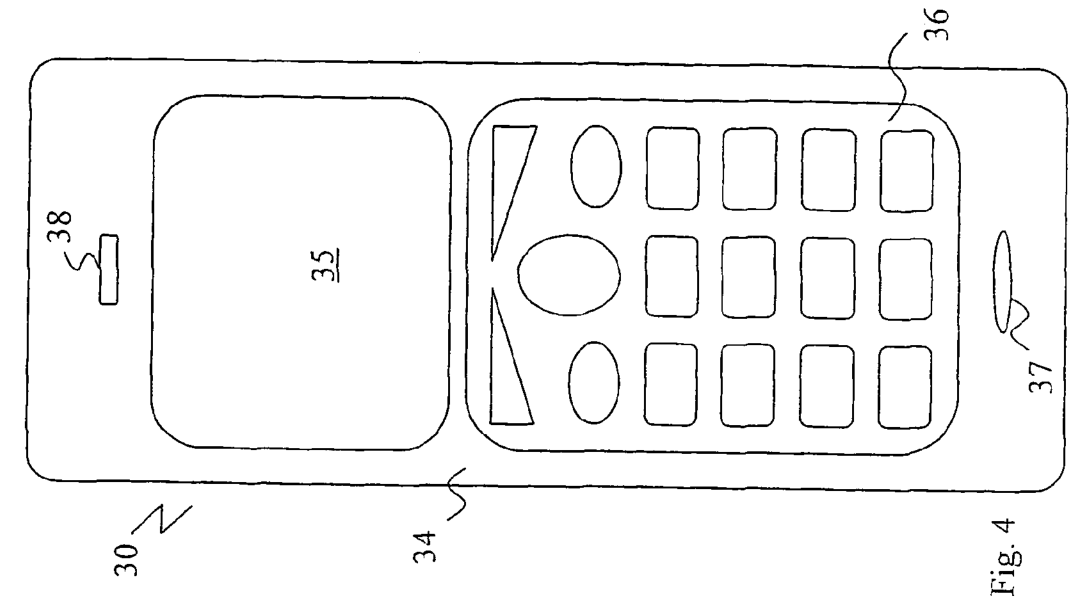
FIG. 4 schematically illustrates a front view of the terminal of FIG. 3.

FIG. 4 illustrates the terminal 30 of FIG. 3 as seen from the front side, i.e. the side facing left in FIG. 3. Besides the elements disclosed in FIG. 3, the terminal 30 further includes a user output, and possibly input, interface is the form of a display 35. A user-input interface is further included in the form of a keypad 36. The terminal also comprises a user audio input in the form of a microphone 37 and a user audio output in the form of a loudspeaker 38 or a connector to an earpiece (not shown). The antenna arrangement according to the invention is built in, and is therefore not explicitly shown in FIG. 4.

Figure 5:
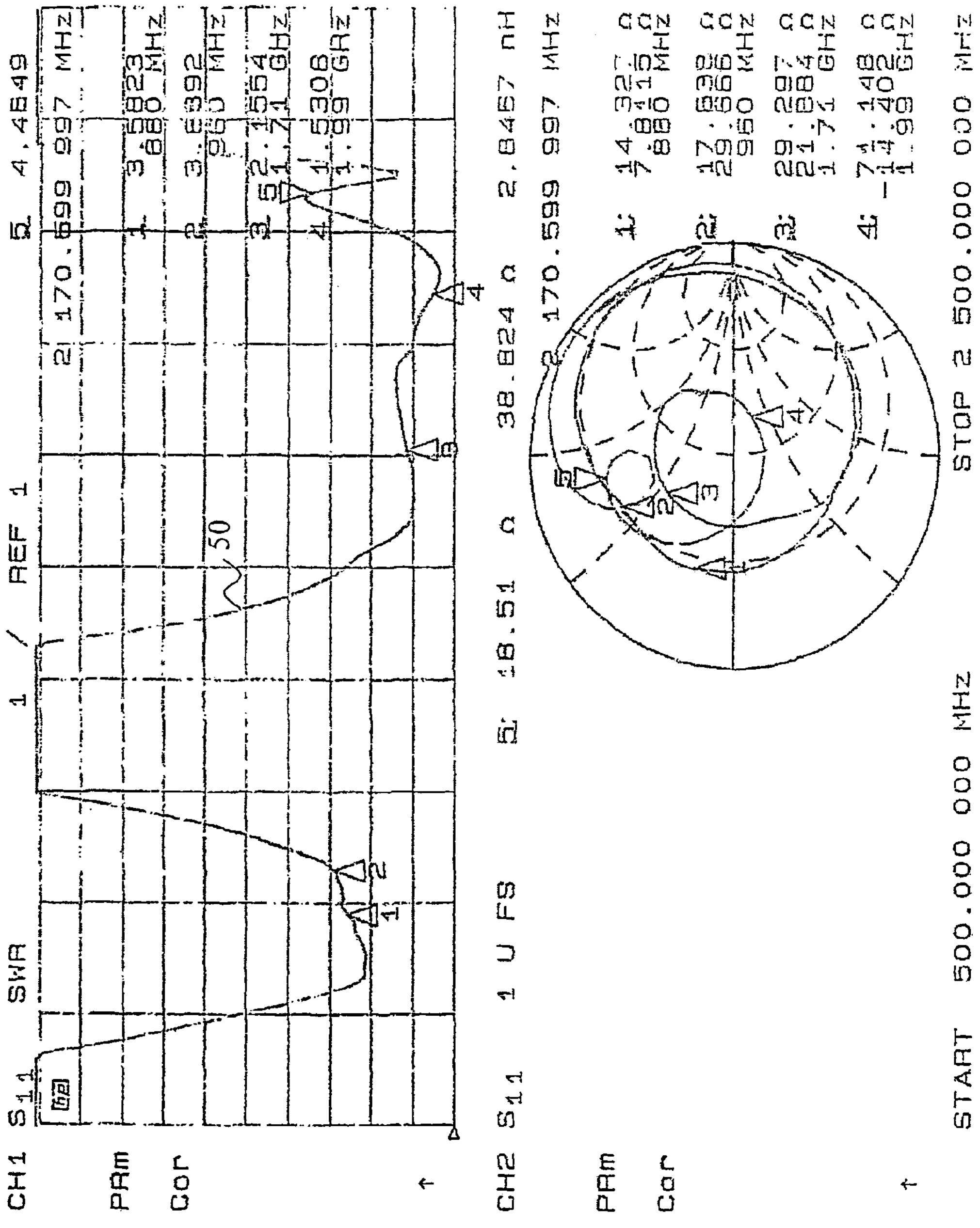
FIG. 5 illustrates the voltage standing wave ratio (VSWR) characteristics for the antenna design of the present invention in free space operation.

FIG. 5 illustrates the VSWR 50 and the Smith chart as measured on a prototype of the antenna according to FIG. 1 in free space. Markers 1 to 4 are equal to 880 MHz, 960 MHz, 1,710 MHz and 1,990 MHz, i.e. the frequency band edges for EGSM, DCS and PCS. As can be seen the margins are very large for each band, especially GSM. It is no problem covering AMPS as well. The VSWR 50 is below 4.0 in all those bands, and for DCS and PCS the VSWR 50 is below 2.2. According to the Smith chart the antenna is generally a little inductive.

The foregoing has described the principles, preferred embodiments and modes of operation of the present invention, but should not be construed as being limited to the particular embodiments discussed above. For example, while the antenna of the present invention has been discussed primarily as being a radiator, one skilled in the art will appreciate that the antenna of the present invention would also be used as a sensor for receiving information at specific frequencies. Similarly, the dimensions of the various elements may vary based on the specific application. Thus, the above-described embodiments should be regarded as illustrative rather than restrictive, and it should be appreciated that variations may be made in those embodiments by workers skilled in the art without departing from the scope of the present invention as defined by the following claims.

The invention claimed is:

1. A multiband radio antenna device for a radio communication terminal, the multiband radio antenna device comprising:

a flat ground substrate;

a flat parasitic element in a plane parallel to said ground substrate, the flat parasitic element having a ground connection;

a flat antenna element having a feeding point and a ground connection, wherein said antenna element has a first longitudinal member, a first transverse member extending from a first end portion of said first longitudinal member, and a second transverse member extending from said first longitudinal member in the same direction as said first transverse member, wherein said parasitic element extends parallel to said second transverse member, wherein said second transverse member extends from a center portion of said first longitudinal member, wherein said parasitic element extends between said first and second transverse members, along and adjacent to an outer portion of said second transverse member from a center portion of the second transverse member, wherein said feeding point is disposed at said center portion of the second transverse member, wherein a first ground connection of the antenna element is disposed at an end portion, opposite said longitudinal member, of the second transverse member, and wherein a second ground connection of the antenna element is disposed at a center portion of said first transverse member.

2. The multiband radio antenna device as recited in claim 1, wherein said parasitic element has a first ground connection disposed adjacent to said feeding point.

3. The multiband radio antenna device as recited in claim 1, wherein said antenna element has a second longitudinal member extending from said end portion of said second transverse member, away from said first transverse member.

4. The multiband radio antenna device as recited in claim 3, wherein said antenna element has a third transverse member extending from an end portion of said second longitudinal member opposite said second transverse member, towards said first longitudinal member.

5. The multiband radio antenna device as recited in claim 4, wherein said antenna element has a fourth transverse member extending from said first longitudinal member between said second and said third transverse members.

6. The multiband radio antenna device as recited in claim 1, wherein said feeding point is disposed on a protruding member at said center portion of the second transverse member, protruding towards first transverse member.

7. The multiband radio antenna device as recited in claim 6, wherein said protruding member is tapered towards said first transverse member.

8. The multiband radio antenna device as recited in claim 7, wherein said parasitic element has a leg member extending parallel to a side of the tapered protruding member facing away from said first longitudinal member.

9. The multiband radio antenna device as recited in claim 1 a an outer portion, extending from said center portion, of said first transverse member has a side edge facing said second transverse member, which side edge extends at an angle towards said second transverse member, such that said first transverse member widens towards its outer end.

10. The multiband radio antenna device as recited in claim 1 wherein said ground plane has a longitudinal length of one third of a selected base band.

11. A radio communication terminal comprising:

a radio transmitter; and a multiband radio antenna device coupled to the radio transmitter, the multiband radio antenna device comprising, a flat ground substrate, a flat parasitic element in a plane parallel to said ground substrate, the flat parasitic element having a ground connection, and a flat antenna element having a feeding point and a ground connection, wherein said antenna element has a first longitudinal member, a first transverse member extending from a first end portion of said first longitudinal member, and a second transverse member extending from said first longitudinal member in the same direction as said first transverse member, wherein said parasitic element extends parallel to said second transverse member, wherein said second transverse member extends from a center portion of said first longitudinal member, wherein said parasitic element extends between said first and second transverse members, along and adjacent to an outer portion of said second transverse member from a center portion of the second transverse member, wherein said feeding point is disposed at said center portion of the second transverse member, wherein a first ground connection of the antenna element is disposed at an end portion, opposite said longitudinal member, of the second transverse member, and wherein a second ground connection of the antenna element is disposed at a center portion of said first transverse member.

12. The radio communications terminal as recited in claim 11, wherein said parasitic element has a first ground connection disposed adjacent to said feeding point.

13. The radio communications terminal as recited in claim 11, wherein said antenna element has a second longitudinal member extending from said end portion of said second transverse member, away from said first transverse member.

14. The multiband radio antenna device as recited in claim 13, wherein said antenna element has a third transverse member extending from an end portion of said second longitudinal member opposite said second transverse member, towards said first longitudinal member.

15. The multiband radio antenna device as recited in claim 14, wherein said antenna element has a fourth transverse member extending from said first longitudinal member between said second and said third transverse members.

16. The multiband radio antenna device as recited in claim 11, wherein said feeding point is disposed on a protruding member at said center portion of the second transverse member, protruding towards first transverse member.

17. The multiband radio antenna device as recited in claim 16, wherein said protruding member is tapered towards said first transverse member.

18. The multiband radio antenna device as recited in claim 17, wherein said parasitic element has a leg member extending parallel to a side of the tapered protruding member facing away from said first longitudinal member.

19. The multiband radio antenna device as recited in claim 11 an outer portion, extending from said center portion, of said first transverse member has a side edge facing said second transverse member, which side edge extends at an angle towards said second transverse member, such that said first transverse member widens towards its outer end.

20. The multiband radio antenna device as recited in claim 11 wherein said ground plane has a longitudinal length of one third of a selected base band.

* * * * *